INVENTOR
JOHN Q. WALKER
BY Charles B. Haverstock
ATTORNEY

March 6, 1973                J. Q. WALKER                 3,719,084
        MEANS FOR SEPARATING ORGANICS CONTAINING FROM ONE TO
              TWENTY CARBONS COMPRISING SERIES CONNECTED
                       PACKED AND CAPILLARY COLUMNS
Filed Sept. 21, 1970                                2 Sheets-Sheet 2

INVENTOR
JOHN Q. WALKER
BY
Charles B. Haverstock
ATTORNEY

United States Patent Office 3,719,084
Patented Mar. 6, 1973

---

3,719,084
MEANS FOR SEPARATING ORGANICS CONTAINING FROM ONE TO TWENTY CARBONS COMPRISING SERIES CONNECTED PACKED AND CAPILLARY COLUMNS
John Q. Walker, Edwardsville, Ill., assignor to McDonnell Douglas Corporation, St. Louis, Mo.
Filed Sept. 21, 1970, Ser. No. 73,755
Int. Cl. G01n 31/08; B01d 15/08
U.S. Cl. 73—23.1                                 14 Claims

ABSTRACT OF THE DISCLOSURE

An apparatus for separating and/or identifying complex mixtures including organics containing from one to twenty carbon atoms and having widely differing boiling points in a continuous process using two different series connected tandem packed and open tubular columns and without the use of subambient temperature programming, backflushing or carrier gas switching techniques. The apparatus is in the nature of a gas chromatograph having substantially expanded operating and detection ranges as compared to existing devices used for the same or similar purposes and as such the present device has broad uses as a research and as a routine analysis tool and can be used to separate and identify the presence of constituents in gaseous, liquid and solid states. Furthermore, while the main use of the present device is in connection with organic substance analysis it can also be used to separate and/or detect the presence of certain inorganic substances as well.

---

Various means and methods of analyzing and identifying by separating the constituents of substances in order to ascertain what constituents are present and the relative amounts thereof have been devised and used heretofore. Various devices are also in existence that are capable of separating and analyzing substances to determine which particular carbons are present. The known devices, however, have limitations or shortcomings not the least of which is that no known device is able in a single continuous operation, and over a range of temperatures wide enough to vaporize all or most of the carbon or other constituents present to separate out and identify the presence of all such constituents. Furthermore, no device has been constructed and used heretofore which is able to cover the full range of organic compounds including all of the compounds which include anywhere from one to twenty carbons and which is able to do so in a single and continuous operation. The present device overcomes these and other limitations and shortcomings of the prior art by teaching the construction and use of a device which includes two series connected tubular members, one of which is larger in diameter and shorter than the other and is packed with an adsorbent material, and the other smaller in diameter longer member is an open tubular member or column having its inner surface coated with an adsorbent material. The prior art does not disclose the use in combination in a gas chromatograph of two such members each having its own distinctive characteristics for separating and identifying certain carbon containing and other substances, said members being connected to operate in series tandem so that during a single continuous pass of a carrier gas laden with a substance to be analyzed, it is possible to separate and/or identify all of the carbon compounds or other volatile substances being searched for and to do so efficiently and in a short period of time and without resorting to subambient temperature programming, backflushing, or carrier gas switching. It is also distinctive of the present device that the several connected tubular portions thereof have substantially the same flow capacity characteristics so that the device can be operated under optimum flow rate conditions taking into account the characteristics of the adsorbent materials employed and the environmental characteristics that are used including the operating temperature and pressure conditions.

It is therefore a principal object of the present invention to provide improved gas chromatographic means for separating and/or identifying in a continuous operation all of the carbon compounds present in a substance being analyzed including compounds which may contain anywhere from one to twenty carbons.

Another object is to provide chromatograph means which are particularly well constructed and suited to being temperature programmed so that a greater range of constituent ingredients can be separated and identified in a continuous operation.

Another object is to substantially reduce the equipment, time and procedure necessary to make a much more complete qualitative and quantitative identification of the constituents of complex mixtures.

Another object is to provide series connected packed and open tubular columns selected and constructed so that optimum flow rate conditions can be established therethrough.

Another object is to teach the construction and operation of a gas chromatograph having improved operating and analyzing characteristics.

Another object is to combine a packed chromatographic column with an open tubular chromatograph column in such a way as to reduce the time and procedure required to analyze substances to determine the constituency thereof.

Another object is to provide means capable of identifying and analyzing a greater number of constituents of substances than has been possible with any known devices.

Another object is to substantially improve the operating efficiency of chromatographic devices.

Another object is to provide means for separating and identifying in a continuous operation all of the organic ingredients present in a substance which have boiling points in a range from about −160° C. to about 350° C.

Another object is to provide improved means for tracing the impurities in compounds.

Another object is to provide improved means for analyzing the composition of solid, liquid and gaseous substances.

Another object is to provide relatively simple and inexpensive means for obtaining information about the composition of substances.

These and other objects and advantages of the present invention will become apparent after considering the following detailed specification in conjunction with the accompanying drawigns, wherein.

Figure 1:
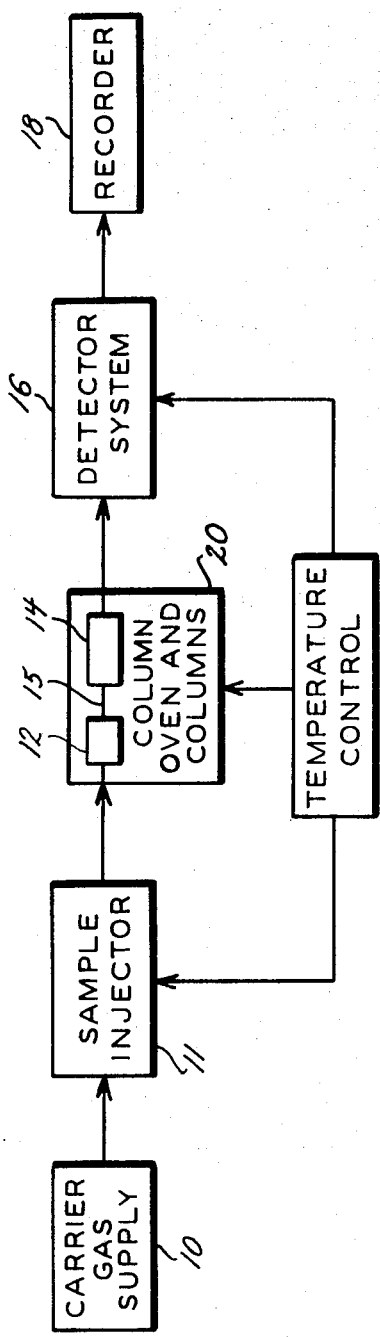
FIG. 1 is a block diagram showing the basic ingredients of a gas chromatograph constructed according to the present invention.
Figure 2:
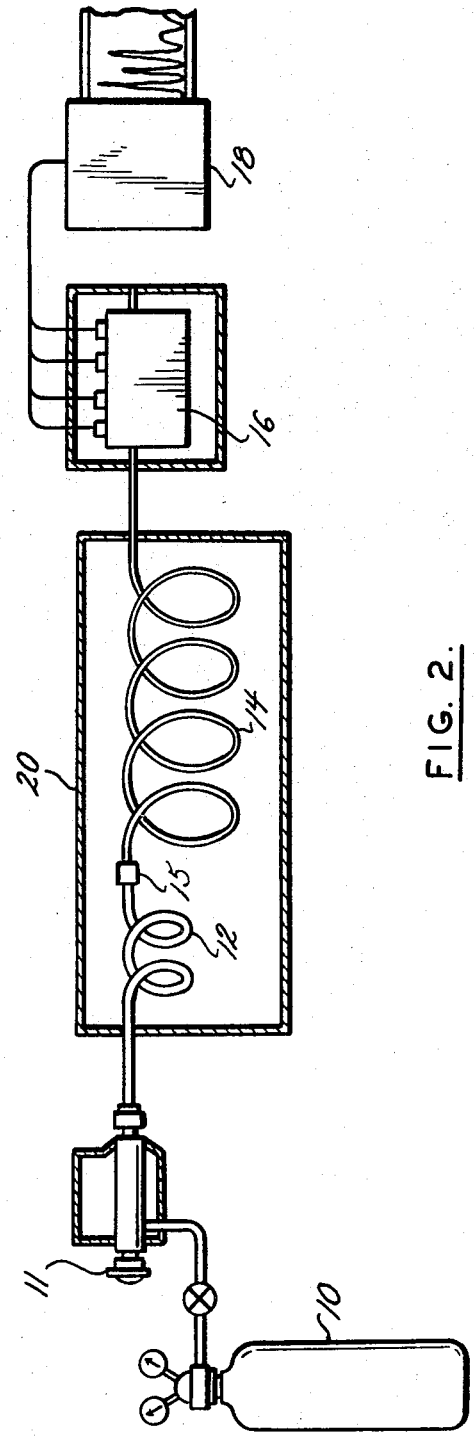
FIG. 2 is a schematic diagram showing more of the details of the subject gas chromatograph.

Referring to the drawings more particularly by reference numbers, number 10 in FIG. 1 refers to a supply or source of carrier gas such as a supply of carbon dioxide, hydrogen, helium, nitrogen, argon or some other suitable gas which is for feeding through a chromatograph constructed according to the present invention. The carrier gas has injected or otherwise introduced into it as by a sample injector 11 a substance to be analyzed, which substance is to have its constituents separated out and identified. The carrier gas from the gas supply means 10 is fed into the inlet or upstream end of a first column which is shown as packed column 12, and is eluted through or more precisely over a stationary sorbent of relatively large surface area which is in the packed column. Various adsorbent materials can be used for this purpose. Certain ingredients of the substances being analyzed will be separated by adsorption as they pass through the column 12 and others will not be so adsorbed.

The opposite end of the packed column 12 is connected by coupling means 15 to the upstream end of another column which is an open tubular column 14 so that the laden gas after passing through the packed column will then elute through the open tubular column 14 and in this column other of the substance ingredients will be separated. As the mixture moves through the columns the solutes separate into segments and with time each occupies a separate portion of the columns, the lower carbon containing compounds being separated in the packed column and the compounds having the greater numbers of carbons separating in the open tubular column. Thereafter, the gas will pass detector means 16 which may include means 18 to indicate and/or record the ingredients that are present in the substance being analyzed. This may include identifying which carbon compounds are present and the approximate amounts thereof on a comparative basis. As will be explained, the present device is primarily designed and constructed to be able to separate out and identify all of the carbons present in a substance from one to twenty in a single continuous operation preferably using temperature programming starting at a low temperature and running through the full range of temperatures necessary to vaporize all of the carbon compounds present. The present device also has applications for identifying the presence of certain inorganic ingredients as well. The heart of the present chromatograph resides in the use of the series connected packed and open tubular columns 12 and 14 connected as shown with the packed column being the upstream column. The columns may also be positioned in an oven 20 or other temperature controlled device. Such devices have been used individually heretofore in gas chromatographs to cover specific ranges of ingredients including particularly the carbon containing compounds, but such devices have been limited to separating out only specific carbon containing organic compounds usually depending on the number of carbon atoms present and no known device has been able to cover the full range of carbon containing organic compounds in a single operation. Furthermore, even in the ranges of their individual usefulness the known devices have produced inferior and often hard to interpret results which is not true of the present construction.

Figure 3:
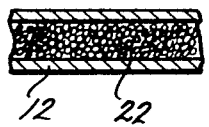
FIG. 3 is an enlarged fragmentary cross-sectional view showing a piece of a packed chromatograph column for use in the present device.
Figure 4:
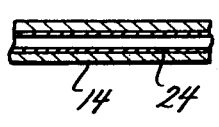
FIG. 4 is an enlarged fragmentary cross-sectional view showing a piece of an open tubular column for use in the present device.
Figure 5:
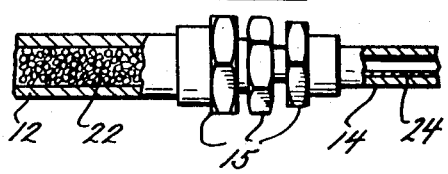
FIG. 5 is a fragmentary side elevational view partly in cross-section showing portions of two series connected columns and the coupling means therebetween.

The packed column 12 is larger in inside diameter than the open tubular column 14 and the diameter can vary over a relatively wide range. A typical range of inside diameter sizes which have been tested for the packed column is the range from about 0.06 to 0.130 inch. Such columns are packed with an adsorbent substance such as porous silica beads 22 (FIG. 3), and a typical bead size range for the named range of tube sizes is from about 50 to about 250 m.²/gm. with an average pore diameter of from about 100 to 300 A. The packed column, as stated, is preferably also the upstream column in the subject system because it is the column in which the lower boiling point carbon compounds are vaporized and separated and this occurs usually at the lower operating temperatures. Furthermore, the packed column is usually much shorter in length than the open tubular column 14 varying on the average in a typical case from a few inches or less to fifty feet and even longer.

The inside diameter of the open tubular column 14 for the comparable range of diameter sizes mentioned above for the packed column 12 is from about 0.01 to about 0.03 inch, and the inner surface of the column 14 is coated with a suitable adsorbent material such as with a high temperature silicon fluid or like substance 24. The size of the porous beads 22 selected for use in the packed column 12 is preferably selected so that the flow capacity through the packed column will be as equal as possible to the flow capacity through the open tubular column 14. This is an important condition because it means that substantially the same optimum flow rate can be established in both of the series connected columns. This improves the operational characteristics of the device by enabling the same uniform flow rate to be established for both columns. A typical open tubular column will have a length which will vary from 45 feet or less to as much as 300 feet or even longer. All of the dimensions and sizes used herein are for illustrative purposes only and are not intended in any sense to define precise dimensional limitations. As a general rule, however, the efficiency of the device will increase to some extent as the diameter of the columns decrease. The efficiency also tends to increase as the operating temperature is reduced.

The subject device is operated by passing the carrier gas from the source 10 through the series connected columns 12 and 14 while injecting by means such as the injector 11 a substance to be analyzed into the carrier gas upstream of the packed column 12. The injected substance can be in a solid, liquid or gaseous state, is vaporized in the injector 11, and is carried by the carrier gas through the series connected columns going first through the packed column. In so doing, certain of the lower carbon content constituents in the substance will be vaporized and adsorbed or separated out by the porous silica beads 22 in the column 12. These are usually the carbon compounds which vaporize at the lower temperatures and contain from one to about five carbon atoms. Thereafter, the carrier gas with the remaining unadsorbed ingredients will pass into the open tbular column 14, sometimes called "capillary column," where the carbon compounds having from about five to twenty carbon atoms will be adsorbed and separated out by the high temperature silicon fluid that coats on the inner surface thereof. During operation, the temperature of the several column portions must be properly maintained or programmed over a range of temperatures that is wide enough to cause all of the various carbon containing ingredients to go into and remain in a vapor phase while passing through one or both columns. The flow rate through the columns is usually kept constant. However, increasing the flow rate will reduce the retention time and reduce the column efficiency to some extent. A higher than necessary temperature will also reduce the retention time and usually also reduce the operating efficiency.

One of the main advantages of the present device is that the columns 12 and 14 can be temperature programmed over a wide enough range of temperatures to separate in a vapor state all organics with from $C_1$ and $C_{20}$ in a single continuous operation. To cover the full range of temperatures necessary to vaporize all of the possible organic compounds containing from one to twenty carbons the temperature should be programmed over a range from about +50° C. to about + 250° C. as the substance is introduced into and is carried along with the carrier gas. This temperature range is somewhat narrower than the range of boiling points of the various carbons but is adequate because once a substance is vaporized a drop in temperature of about 100° C. or more below the boiling point is usually necessary to cause the substance to go out of its vapor state. It has not been possible with any known device to detect the presence of all such carbon compounds during a single continuous process, and in fact to known gas chromatograph exists which in a single continuous operation is able to cover the full range of carbons and other detectable substances.

Figure 6:
FIG. 6 is a typical chart or chromatogram showing the results obtained when said packed column such as shown in FIG. 3 is used by itself in a chromatograph.
Figure 7:
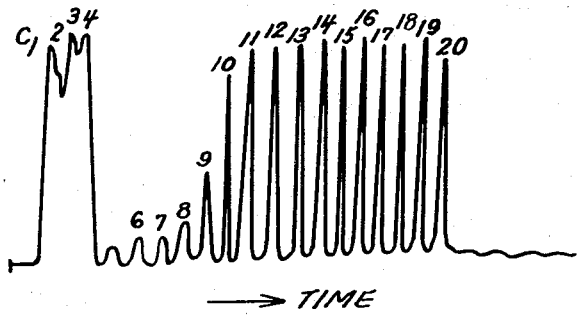
FIG. 7 is a typical chromatogram showing the results obtained when an open tubular column such as shown in FIG. 4 is used by itself in a chromatograph; and, FIG. 8 is a chromatogram showing typical results obtained when a packed column such as shown in FIG. 3 is connected in series with an open tubular column such as shown in FIG. 4 by coupling means such as shown in FIG. 5.
Figure 8:
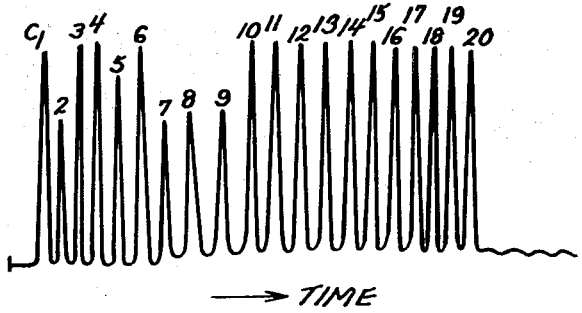

Various forms of detectors can be used with the present device including a conventional thermal conductivity detector which employs a Wheatstone bridge circuit connected to means at or adjacent to the outlet end of the open tubular column 14. The device operates by the adsorption materials in the columns adsorbing the various ingredients as they pass therethrough and later releasing them so they will move past the detector means. The retention times for the different adsorbed materials is different and this is important because it means that each adsorbed material will be released at a different time making it possible for the detector to detect and identify each by retention time. The retention times also depend on the environmental conditions including particularly the temperature and the flow rate of the carrier gas. A total operating cycle can vary widely depending on environment from a few seconds in some cases to as long as thirty minutes or even longer in some cases. Each different ingredient present will unbalance the bridge to a different distinct amount and in so doing will produce a distinctive output indication. The thermal conductivity detector therefor provides accurate means to detect variation in thermal conductivity due to the presence of the different carbons and these changes can be used to control a chromatogram or other indicating and/or recorder means. The chromatograms produced may also provide some indication as to the amounts or relative amounts of the various ingredients. The charts included with FIGS. 6–8 are typical and representative for the series columns of the present device when operating individually and in combination. It is also possible to feed the effluent output of the subject device to still other kinds of analysis devices such as to a mass spectrometer or the like for qualitative or other analysis as desired. The detection and/or recording means selected for use with the subject device as such are not part of the invention.

The columns 12 and 14 can be constructed of various materials including stainless steel, copper, aluminum, glass, plastic, and other like substances, and they can be constructed to be made straight, to be bent or to be coiled. The coiled form is usually preferred, however, because the columns can then be made much more compact to facilitate temperature control and/or programming. Also, stainless steel is usually the most suitable material from which to make the columns because stainless steel has less of a tendency to adsorb or react with certain of the organic compounds that may be present. Straight columns also have some operational advantages particularly for the packed column, but it is usually more convenient to use the coil form, especially when the columns are fairly long, to facilitate temperature programming when relatively high and low operating temperatures are required. Also, when the columns are to be coiled, it is usually desirable to make the coils as large in diameter as possible to minimize diffusion, to make the adsorption characteristics as uniform as possible throughout, and to reduce or eliminate so-called racetrack effects which are effects produced by having some portions of the material travel faster and further than other portions as they move through the columns. These effects can cause inaccuracy and error in the results. As a general rule the diameter of the coils when coiled columns are used should be at least about ten times as great as the column diameter to minimize the diffusion and racetrack effects.

The lengths selected for the two kinds of columns can be varied rather substantially depending upon the substances to be analyzed including the number of organics expected to be present. The open tubular column, as already stated, will usually be substantially longer than the packed column and will have a much smaller internal diameter than the internal diameter of the packed column so that the flow rate through the open tubular column can be made to be approximately the same as the flow rate through the packed column taking into account the packing material size characteristics. This is controlled by proper selection of the particle or bead size used. The tube sizes and lengths as well as bead sizes mentioned above are typical for the present device but are not exhaustive of the possibilities.

The columns are usually positioned in a container such as oven 20 where the temperature can be controlled and/or monitored or programmed to hold in a vapor state all of the organic compounds and other adsorbable ingredients present in the specimen. The operating temperature or temperature range should be selected or controlled so that a complete separation and analysis can be accomplished in a reasonable length of time. A simplified approximation is that the retention time of an adsorbent material will double for every 30° C. decrease in the column temperature. This means that if the temperature of the column is reduced by 30° C. the adsorbent material will retain the ingredients in an adsorbed condition for approximately twice as along a time period as would be the case at the higher temperature. For most specimens the lower the column operating temperature the higher will be the ratio of partition coefficients in the stationary phase and the better the resultant separation. The operating efficiency will also be better at lower temperatures. Furthermore, if the temperature is allowed to become too high it may be difficult to distinguish between the peaks that represent the various carbons. It is not always practical to use the lowest possible operating temperature, however, particularly in cases where the specimen contains ingredients that have widely varying boiling points. Under these conditions, it may be desirable to temperature program the specimen beginning at the low end of the temperature range and increasing the temperature as the separation continues to cover the full spectrum of ingredient boiling point temperatures rather than to rely on a single relatively high unprogrammed temperature that is selected to be high enough to cover the boiling points of all of the various ingredients that may be present. When temperature programming is used, the temperature at the beginning of an analysis should be relatively low, but high enough to be higher than the boiling point of the carbon compounds having the fewest carbon atoms so that as the temperature is increased the full spectrum of carbon compounds will be vaporized and will appear at the detector means in the output at later times depending on their retention times.

As explained above, various kinds of detectors can be used with the present chromatograph including those detectors that operate with a Wheatstone bridge circuit as described above. Several types of detectors can be used including thermal conductivity cell detectors and flame ionization detectors sometimes called FID. Such devices produce resistance or impedance changes in one or more arms of the Wheatstone bridge and in so doing produce bridge imbalances and corresponding output signals to indicate the degree of bridge imbalance. The outputs produced by the bridge imbalances may be used to feed recorder means where they record as peaks and valleys on a graph, chromatogram or other similar recording. A typical FID type detector uses hydrogen and air to produce a flame in which a collector electrode biased to some suitable D.C. potential is positioned. An output which is a measurement of the conductivity of the flame is produced in this way. For example, when pure air and hydrogen are present, the conductivity measured will be relatively low and as the other components such as the organic compounds are combusted, the measured conductivity will increase and produce currents which can be amplified and used to operate associated recorder means. The details of the detector and recorder means selected for use with the present device as such are not part of the present invention.

One of the important distinctive features of the present device resides in the use of two series connected tubular columns, one being a packed column and the other an open tubular column. This combination enables the full range of molecules having from one to twenty carbon atoms as well as other adsorbable materials to be separated and identified in a single continuous operation as a carrier gas laden with the substance to be analyzed passes therethrough. Two such mated columns having similar optimum flow rate characteristics is also a distinguishable feature of the present device over all known prior art devices. This combination enables the present gas chromatograph to also be used to detect trace impurities in a compound and the combination can be used to analyze substances which may be introduced into it in a solid, liquid or gaseous form. The structure of the present device lends itself to being temperature programmed over a wide temperature range to be able to maintain all of the constituents being searched for in a vaporized state including, for example, all organic compounds whose boiling points vary from as low as about $-160°$ C. and even lower to as high as $350°$ C. and higher. This range can be expanded even further for other substances including certain inorganic compounds and research is being performed in this direction. This has not been possible heretofore with any known device all of which are limited in certain ways such as being restricted to detecting the presence of only a limited number of organic compounds and/or limited as to their operating temperature ranges and in some cases as to their flow rates. The present device therefore presents a substantial advance in the art of substance analysis and is a valuable research tool as well as a valuable on line or field instrument for use in analyzing substances such as natural gas, pyrolysis product separation of substances such as moon dust, planet soils, monomers, polymers, plastics, paints, diving tissue, microorganisms, viruses, analysis of water and air pollution, crude oil and crude oil fractions, trace impurities in pure organic compounds such as hydrocarbons, acids, esters, amine, ketones, alcohols and inorganic gases, other organic and inorganic substances, substances which may be in solid, liquid and gaseous states, and for detecting traces of substances or impurities in specimens which are not detectable by any other known means.

FIG. 6 illustrates typical results obtained when a substance is injected into a carrier gas and is passed through only a packed column such as the packed column 12 of the present device. Note, that only those hydrocarbons present having from about one to about five carbon atoms are clearly detectable and appear on the chromatogram.

FIG. 7 illustrates the results obtained for the same specimen when only an open tubular column such as the open tubular column 14 is used. In this case, only those organic compounds having from about nine to about twenty carbon atoms are clearly and precisely detected and indicated on the chromatogram.

FIG. 8 shows the results for the same specimen when the sample is passed through a chromatograph such as disclosed herein which includes series connected packed and open tubular columns. It is clear from the chromatogram in FIG. 8 that all of the carbons present in the full range from one to twenty carbons are clearly and distinctly indicated on the chromatogram and this result is obtained by a single continuous pass of a mixture of the specimen and a carrier gas therethrough. Note, in the graphs how the results are improved when the columns 12 and 14 are operated in series. The improvements are further enhanced by proper selection of the size and lengths of the columns and of the packing material for the packed column taking into consideration the inside diameter of the open tubular column which in the usual case is much smaller than the packed column. The operating conditions may also effect the results.

Thus there has been shown and described a novel gas chromatograph column arrangement having much wider operating conditions and capable of more detailed analysis of substances, which gas chromatograph fulfills all of the objects and advantages sought therefor. Many changes, modifications, alterations, and other applications and uses for the subject gas chromatograph will, however, become apparent after considering the subject specification and the accompanying drawing. All such changes, modifications, and other uses and applications which do not depart from the spirit and scope of the invention are deemed to be covered by the invention which is limited only by the claims which follow.

What is claimed is:

1. A gas chromatograph comprising a source of carrier gas, first and second tubular members having opposite upstream and downstream ends, a tubular coupling connecting the downstream end of the first member to the upstream end of the second member so that said members are connected in series, other means coupling the upstream end of said first tubular member to said gas source whereby gas from said source flows through said tubular members, the inside diameter of said first tubular member being in a range from about 0.060 inch to about 0.130 inch and the inside diameter of said second tubular member being in a range from about 0.010 inch to about 0.030 inch, said first tubular member being relatively much shorter in length than the second tubular member having a length that is in a range from less than about one foot to about 50 feet for a length range for the second tubular member which is from about 45 feet to about 300 feet, said second tubular member having an inner surface formed by a coating of an adsorbent material and said larger diameter first tubular member being packed with particles of an adsorbent substance of a predetermined size selected to make the flow capacities of the said first and second tubular members approximately the same, means for introducing a specimen into the gas from the gas source upstream of the tubular members, means located adjacent to the downstream end of the said series connected tubular members for detecting the passage thereby of selected ingredients of the specimen that are adsorbed by the adsorbent particles and by the adsorbent coating in said tubular members and thereafter released and carried along with the carrier gas, and means for maintaining the said tubular members at a temperature that is high enough to vaporize selected ones of the specimen ingredients to be detected.

2. The gas chromatograph defined in claim 1 wherein the first tubular member is located upstream of the second tubular member, said first tubular member being substantially shorter in length than the second tubular member.

3. The gas chromatograph defined in claim 1 wherein said means to maintain the tubular members at a temperature high enough to maintain all of the specimen ingredients being searched for in a vapor state include means to program the temperature over a predetermined range during operation of the chromatograph.

4. The gas chromatograph defined in claim 3 wherein the specimen includes organics containing ingredients that may have anywhere from one to twenty carbon atoms, said temperature programming means including means to vary the temperature of the said first and second tubular members over a range from about $+50°$ C. to about $+250°$ C.

5. The gas chromatograph defined in claim 1 wherein the carrier gas source is a source of carrier gas selected from the group consisting of carbon dioxide, hydrogen, helium, nitrogen and argon.

6. The gas chromatograph defined in claim 1 wherein the detection means include means sensitive to the impedance of the carrier gas and the effluent ingredients released from the adsorbent material in the tubular members as they are carried by the carrier gas thereby.

7. A gas chomatograph comprising a source of carrier gas, sample injector-vaporizer means for injecting a sample in a vaporized state into the gas from said source, a packed column including a tubular member packed with particles of an adsorbent material having preselected particle size and effluent adsorbing characteristics, said packed column having an inside diameter in a range from about 0.060 inch to about 0.130 inch, an open tubular column smaller in inside diameter but longer than the packed column, said open tubular column having an inside diameter in a range from about 0.010 inch to about 0.030 inch, the length of the packed column being in a range from less than about one foot to greater than about 50 feet for a length of the open tubular member of from less than about 45 feet to greater than about 300 feet, means forming an adsorbent coating on the inner surface of the open tubular column, the preselected particle size of the particles in the packed column being selected so that the flow capacities of the open and the packed columns are approximately the same, means directly coupling and connecting one end of the packed column to one end of the open tubular column to form an uninterrupted series flow path through the said columns, means connecting the other end of the packed column to the gas source, means for establishing a predetermined temperature environment surrounding the said columns, means for introducing a substance to be analyzed into the carrier gas upsteam of the series connected columns, and detector means located adjacent to the downstream end of the open tubular column, said detector means including means for detecting changes in the impedance characteristics of the carrier gas due to the presence therein of constituent ingredients of the substances being analyzed as the ingredients are released from the adsorbent particles and the adsorbent coating and are carried by the carrier gas past the detector means.

8. The gas chromatograph defined in claim 7 including means for programming the temperature environment established surrounding the columns to cover the range of effluent ingredients to be detected.

9. The gas chromatograph defined in claim 7 wherein the substance to be analyzed is an effluent substance containing carbon compounds all of which are vaporizable within a known temperature range.

10. The gas chromatograph defined in claim 7 wherein the substance to be analyzed is introduced into the carrier gas in gaseous form.

11. The gas chromatograph defined in claim 7 wherein the substance to be analyzed is introduced into the carrier gas in a gas state from the vaporization of a liquid sample substance.

12. The gas chromatograph defined in claim 7 wherein the substance to be analyzed is introduced into the carrier gas in a gas state from the vaporization of a solid sample substance.

13. The gas chromatograph defined in claim 7 including recording means connected to the detector means for producing a chromatogram of the analysis results.

14. The gas chromatograph defined in claim 7 wherein the means for establishing a predetermined temperature environment surrounding said columns includes an oven, at least one of said columns being in a coiled form in said oven.

References Cited
UNITED STATES PATENTS

| | | | |
|---|---|---|---|
| 3,120,749 | 2/1964 | Paglis et al. | 73—23.1 |
| 3,234,779 | 2/1966 | Dawson | 73—23.1 |
| 3,324,709 | 6/1967 | Szonntagh | 73—23.1 |
| 3,206,968 | 9/1965 | Leggoe et al. | 73—23.1 |
| 3,181,344 | 5/1965 | Burow | 73—23.1 |
| 3,263,488 | 8/1966 | Martin | 73—23.1 |
| 3,356,458 | 12/1967 | Steinle et al. | 73—23.1 X |

OTHER REFERENCES

Condon, "Design Considerations of a Gas Chromatography System Employing High Efficiency Golay Columns," Anal. Chem., vol. 31, No. 10, October 1959.

Barrall et al., "Gas. Chrom. Anal. of Normal and Branched Chain Hydrocarbons in the Range $C_7$ to $C_{20}$ Using Molecular Sieve," J. Gas. Chrom., August 1964.

McEwen, "Automobile Exhaust Hydrocarbon Analysis by Gas Chromatography," Anal. Chem., vol. 38, No. 8, July 1966.

RICHARD C. QUEISSER, Primary Examiner

C. E. SNEE III, Assistant Examiner

U.S. Cl. X.R.

55—197